United States Patent
Vishnoi et al.

(10) Patent No.: US 10,447,605 B2
(45) Date of Patent: Oct. 15, 2019

(54) FLOW-BASED HOST DISCOVERY IN SDN NETWORKS

(71) Applicant: AVAGO TECHNOLOGIES INTERNATIONAL SALES PTE. LIMITED, Singapore (SG)

(72) Inventors: Anil Vishnoi, San Jose, CA (US); Balaji Varadaraju, Austin, TX (US); Vasu Srinivasan, Cedar Park, TX (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 412 days.

(21) Appl. No.: 15/233,182

(22) Filed: Aug. 10, 2016

(65) Prior Publication Data

US 2017/0118128 A1   Apr. 27, 2017

Related U.S. Application Data

(60) Provisional application No. 62/247,078, filed on Oct. 27, 2015.

(51) Int. Cl.
*G06F 15/173*   (2006.01)
*H04L 12/851*   (2013.01)
(Continued)

(52) U.S. Cl.
CPC .......... *H04L 47/2483* (2013.01); *H04L 41/12* (2013.01); *H04L 45/02* (2013.01)

(58) Field of Classification Search
CPC ...... H04L 47/2483; H04L 41/12; H04L 45/02
(Continued)

(56) References Cited

U.S. PATENT DOCUMENTS 6,553,002 B1 *   4/2003   Bremer ................... H04L 45/00
                                                                370/254
9,331,930 B1 *   5/2016   Ramasubramanian ......................
                                                                H04L 41/12
(Continued)

OTHER PUBLICATIONS

Brocade: BVC—Topology and host discovery—Brocade Community Forums—71210, Mar. 22, 2016; 3 pages; http://community.brocade.com/t5/DevNet-Discussions/BVC-Topology-and-host-discovery/td-p/71210.
(Continued)

*Primary Examiner* — Liang Che A Wang
*Assistant Examiner* — Kaylee J Huang
(74) *Attorney, Agent, or Firm* — Xsensus LLP

(57) ABSTRACT

Techniques for performing flow-based host discovery in an SDN network are provided. According to one embodiment, an SDN controller can select, based on network topology information that is stored on the controller, a leaf network device in the network, and can determine a traffic flow corresponding to a flow rule installed on the leaf network device. The determining of the traffic flow can be based on flow rule information that is stored on the SDN controller. The SDN controller can further determine a forward path for the traffic flow through the network, where the determining of the forward path is performed by associating the flow rule with other flow rules for the traffic flow that are included in the flow rule information, and where the other flow rules are installed on other network devices in the network. The SDN controller can then determine, based on at least the forward path, host information for the source and destination hosts of the traffic flow.

17 Claims, 6 Drawing Sheets

(51) Int. Cl.
*H04L 12/24* (2006.01)
*H04L 12/751* (2013.01)

(58) Field of Classification Search
USPC .......................................... 709/224, 223, 244
See application file for complete search history.

(56) References Cited

U.S. PATENT DOCUMENTS

| | | | |
|---|---|---|---|
| 9,356,866 B1* | 5/2016 | Sivaramakrishnan | ........................ H04L 45/7453 |
| 2010/0158048 A1* | 6/2010 | Arimilli | ................ G06F 11/106 370/476 |
| 2013/0136133 A1* | 5/2013 | Alkhatib | ........... H04L 29/12047 370/392 |
| 2013/0311675 A1* | 11/2013 | Kancherla | ............. H04L 43/026 709/244 |
| 2017/0070435 A1* | 3/2017 | Marco | ................ H04L 47/2416 |

OTHER PUBLICATIONS

Technical white paper; HP SDN hybid network architecture; Scalable, low-risk network deployments using hybrid SDN; Copyright 2015 Hewlett-Packard Development Company, L.P.; 4AA5-6738ENW, Apr. 2015; 9 pages.
Aaron Rosen: "Network Service Delivery and Throughput Optimization via Software Defined Networking"; Clemson University; 2012; All Theses. Paper 1332; 65 pages.
Mekky et al.: "VIRO-GENI: SDN-based Approach for a Non-IP Protocol in GENI"; Research and Educational Experiment Workshop (GREE), 2014 Third GENI; Mar. 19-20, 2014; 4 pages.

* cited by examiner

FLOW-BASED HOST DISCOVERY IN SDN NETWORKS

CROSS-REFERENCES TO RELATED APPLICATIONS

The present application claims the benefit and priority of U.S. Provisional Application No. 62/247,078, filed Oct. 27, 2015, entitled "System and Method for Flow Based Host Discovery In Proactively Configured SDN Network," the entire contents of which are incorporated herein by reference in its entirety for all purposes.

BACKGROUND

Software-defined networking (SDN) is a computer networking paradigm in which a centralized software-based controller, known as an SDN controller, manages and controls the various network devices (e.g., switches, routers, etc.) residing in a network. For example, the SDN controller can determine, via one or more applications running on the controller, rules for forwarding traffic flows within the network. The SDN controller can then install these rules (using, e.g., an SDN protocol such as OpenFlow) onto the network's switches and/or routers, thereby programming those devices to forward packets in accordance with the determined flows.

One task that may be performed by an SDN controller is host discovery—in other words, the act of automatically identifying all of the hosts (i.e., physical or virtual computer systems) that are connected to the network and how each host is connected. For instance, if hosts H1 and H2 are connected to network N, the host discovery process would involve determining the identities (e.g., network addresses) of H1 and H2, as well as the specific network devices and ports of network N to which H1 and H2 are coupled. This host information may be used by the applications running on the SDN controller to carry out their network services. The host information may also be used for other purposes, such as to provide network administrators a view of the overall network topology.

Unfortunately, existing approaches for performing host discovery suffer from a number of drawbacks. One such approach, known as packet-based discovery, involves programming the network devices in the network with flow rules that cause the devices to forward certain types of host-originated packets (e.g., ARP, ICMP, etc.) to the SDN controller. The SDN controller then receives these packets, decodes them, and determines host information from the decoded information. The problems with this approach are that (1) it requires the flow rules on each network device to be explicitly modified to send host-originated packets to the SDN controller, and (2) it requires the SDN controller to decode and process those packets, which incurs a performance overhead that increases proportionally with the number of hosts connected to the network. In deployments with a large number of hosts, such as large-scale virtualized data centers, this performance overhead can potentially render the SDN controller inoperable for carrying out other functions.

According to another existing host discovery approach, known as protocol-based discovery, the SDN controller proactively broadcasts discovery packets (e.g., ARP (Address Resolution Protocol) or NS (Network Solicitation) packets) to the network. The discovery packets are received at the hosts, which respond by transmitting ARP or NS response packets back to the SDN controller. The SDN controller then receives the response packets, decodes them, and determines host information from the decoded information. The main drawback of this approach is that, like packet-based discovery, the SDN controller must decode and process each response packet (one per host), which increases the load on the controller as the number of hosts increases. Further, the act of broadcasting the discovery packets through the network places an additional processing burden on the SDN controller and the network's constituent devices.

SUMMARY

Techniques for performing flow-based host discovery in an SDN network are provided. According to one embodiment, an SDN controller can select, based on network topology information that is stored on the controller, a leaf network device in the network, and can determine a traffic flow corresponding to a flow rule installed on the leaf network device. The determining of the traffic flow can be based on flow rule information that is stored on the SDN controller. The SDN controller can further determine a forward path for the traffic flow through the network, where the determining of the forward path is performed by associating the flow rule with other flow rules for the traffic flow that are included in the flow rule information, and where the other flow rules are installed on other network devices in the network. The SDN controller can then determine, based on at least the forward path, host information for the source and destination hosts of the traffic flow.

The following detailed description and accompanying drawings provide a better understanding of the nature and advantages of particular embodiments.

DETAILED DESCRIPTION

Figure 1:
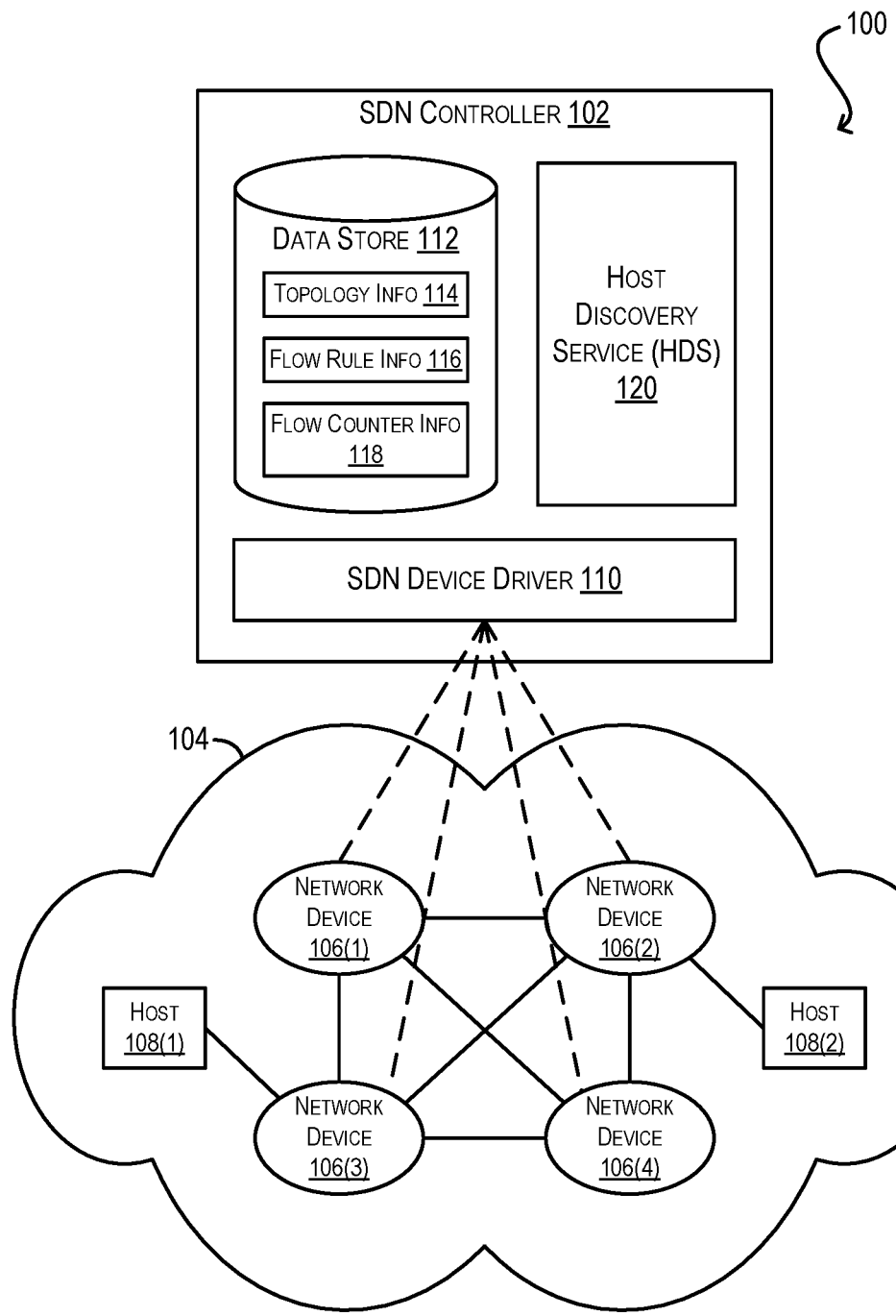
FIG. 1 depicts an example system environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide flow-based techniques for performing host discovery in an SDN network (i.e., a network that is managed/controlled via a central SDN controller). These techniques generally assume that the network is proactively configured—in other words, the network devices of the network have been pre-programmed with flow rules defining traffic flows to be forwarded by the devices. These techniques also assume that the SDN controller of the network maintains a data store comprising the pre-programmed flow rules, as well as topology information for the network (e.g., the identities of the network's switches/routers and how those devices are interconnected). These assumptions will typically hold true for SDN networks that are deployed by, e.g., telecommunications service providers and other similar entities.

According to one set of embodiments, the SDN controller can select, based on the stored topology information, a leaf network device at random in the network, where a leaf network device is a network device that can be connected to one or more hosts. The SDN controller can then: (1) iterate through the flow rules for that leaf network device (based on the stored flow rule information); (2) identify, from the flow rules, a flow comprising a source host H1 and a destination host H2; and (3) determine a forward path (and potentially a reverse path) for the flow through the network by associating the flow rules of the leaf network device with the flow rules of other network devices connected to the leaf network device. Finally, using the forward and/or reverse paths, the SDN controller can determine host information for H1 and H2 (e.g., their network addresses and their points of connection to the network), thereby "discovering" those hosts. This process can be repeated for other flows specified by other flow rules of the leaf network device, as well as for other leaf network devices in the network, until all of the connected hosts have been discovered.

Using the flow-based host discovery approach described above, a number of advantages can be realized over existing approaches. First, with flow-based discovery, the SDN controller does not need to modify or install flow rules onto the network's switches/routers in order to redirect host-originated packets to the controller (as in the case of packet-based discovery), or broadcast discovery packets throughout the network in order to solicit response packets from the hosts (as in the case of protocol-based discovery). This reduces the processing and traffic load on the SDN controller and the switches/routers.

Second, since there are no host packets being sent to the SDN controller, the controller does not need to dedicate any resources to processing (e.g., receiving, decoding, etc.) such packets. This makes the flow-based approach of the present disclosure more scalable than existing approaches and enables the SDN controller to efficiently perform host discovery in SDN deployments comprising hundreds, thousands, or potentially more hosts.

In certain embodiments, as part of the host discovery process, the SDN controller can leverage flow counter information that is collected at the controller to determine which of the discovered hosts are active (i.e., are sending out packets). This ensures that the discovered hosts are physically connected to the SDN network, rather than simply being specified in the proactive flow configuration of the network.

In further embodiments, the SDN controller can leverage the flow counter information to monitor the discovered active hosts and determine when one or more active hosts have become inactive (i.e., have failed to send out any packets within a predetermined time period). These inactive hosts can be subsequently removed from the discovered host list.

The foregoing and other aspects of the present disclosure are described in further detail in the sections that follow.

2. System Environment

FIG. 1 depicts a system environment 100 that supports flow-based host discovery according to an embodiment. As shown, system environment 100 includes an SDN controller 102 that is communicatively coupled with a network 104 comprising interconnected network devices (e.g., switches) 106(1)-(4). Network devices 106(1)-(4) are, in turn, communicatively coupled with hosts 108(1) and 108(2). SDN controller 102 is a software-based component (running on, e.g., a general purpose computer system or cluster of systems) that centrally manages the configuration and operation of network devices 106(1)-(4). In one embodiment, SDN controller 102 can be implemented using the Brocade SDN Controller developed by Brocade Communications Systems, Inc. In another embodiment, SDN controller 102 can be implemented using the open-source OpenDaylight SDN Controller. Hosts 108(1) and 108(2) are physical or virtual computer systems that provide information, services, applications, and/or other resources to other nodes in network 104.

In the example of FIG. 1, SDN controller 102 includes an SDN device driver 110, which controller 102 uses to interact with network devices 106(1)-(4) using a southbound SDN protocol such as OpenFlow. SDN controller 102 also includes a data store 112, which stores three types of data sets: topology information 114, flow rule information 116, and flow counter information 118. Topology information 114 comprises information regarding the network device topology of network 104 (e.g., the identities of network devices 106(1)-(4) and how they are connected to each other). This topology information may be entered manually into data store 112 by a network administrator, or determined automatically by SDN controller 102 using a topology discovery mechanism.

Flow rule information 116 comprises information regarding the flow rules that have been programmed onto the network devices of network 104. Each flow rule specifies one or more criteria for a traffic flow (e.g., source IP address, source MAC address, destination IP address, destination MAC address, etc.) and a corresponding action to be performed when a packet is received at a network device that matches the one or more criteria (e.g., forward packet out of port Y). For purposes of the present disclosure, it is assumed that network 104 is proactively configured (i.e., network devices 106(1)-(4) are pre-programmed with flow rules prior to being used in a live/production setting). Thus, flow rule information 116 will include a record of each flow rule that has been proactively configured on network devices 106(1)-(4).

Flow counter information 118 comprises statistics regarding the number of times each flow rule in flow rule information 116 is matched (i.e., triggered) by an incoming packet at its associated network device. Generally speaking, SDN controller 102 will fetch, via SDN device driver 110, the latest statistics from network devices 106(1)-(4) on a periodic basis and update flow counter information 118 accordingly. In this way, SDN controller 102 can keep flow counter information 118 up-to-date as traffic flows through network 104.

As noted in the Background section, one of the tasks that may be performed by an SDN controller is host discovery. However, existing host discovery mechanisms like packet-based and protocol-based discovery require the SDN controller to receive, decode, and process packets on a per-host basis in order to carry out the discovery process, which makes these mechanisms difficult to scale as the number of hosts in the network increases.

To address these and other similar issues, SDN controller 102 of FIG. 1 includes a novel host discovery service (HDS) 120 that is communicatively coupled with data store 112. At a high level, HDS 120 can execute an algorithm for automatically discovering the hosts connected to network 104, where the algorithm does not require SDN controller 102 to process any host-originated packets; instead, the algorithm relies solely on the locally-stored information (i.e., topology, flow rule, and flow counter information) in data store 112. This allows SDN controller 102 to perform host discovery in a manner that is more scalable and efficient than existing approaches. The details of the algorithm, along with certain optimizations and enhancements (such as determining the activity/inactivity of discovered hosts), are provided below.

It should be appreciated that system environment 100 of FIG. 1 is illustrative and not intended to limit embodiments of the present invention. For example, although FIG. 1 depicts a particular number of network devices (4) and hosts (2), any number of such network devices and hosts may be supported. Further, while FIG. 1 shows these network devices and hosts as being connected according to a particular network topology, the embodiments described herein may be applied to any type of network topology. One of ordinary skill in the art will recognize many variations, modifications, and alternatives.

3. Host Discovery Workflow

Figure 2A:
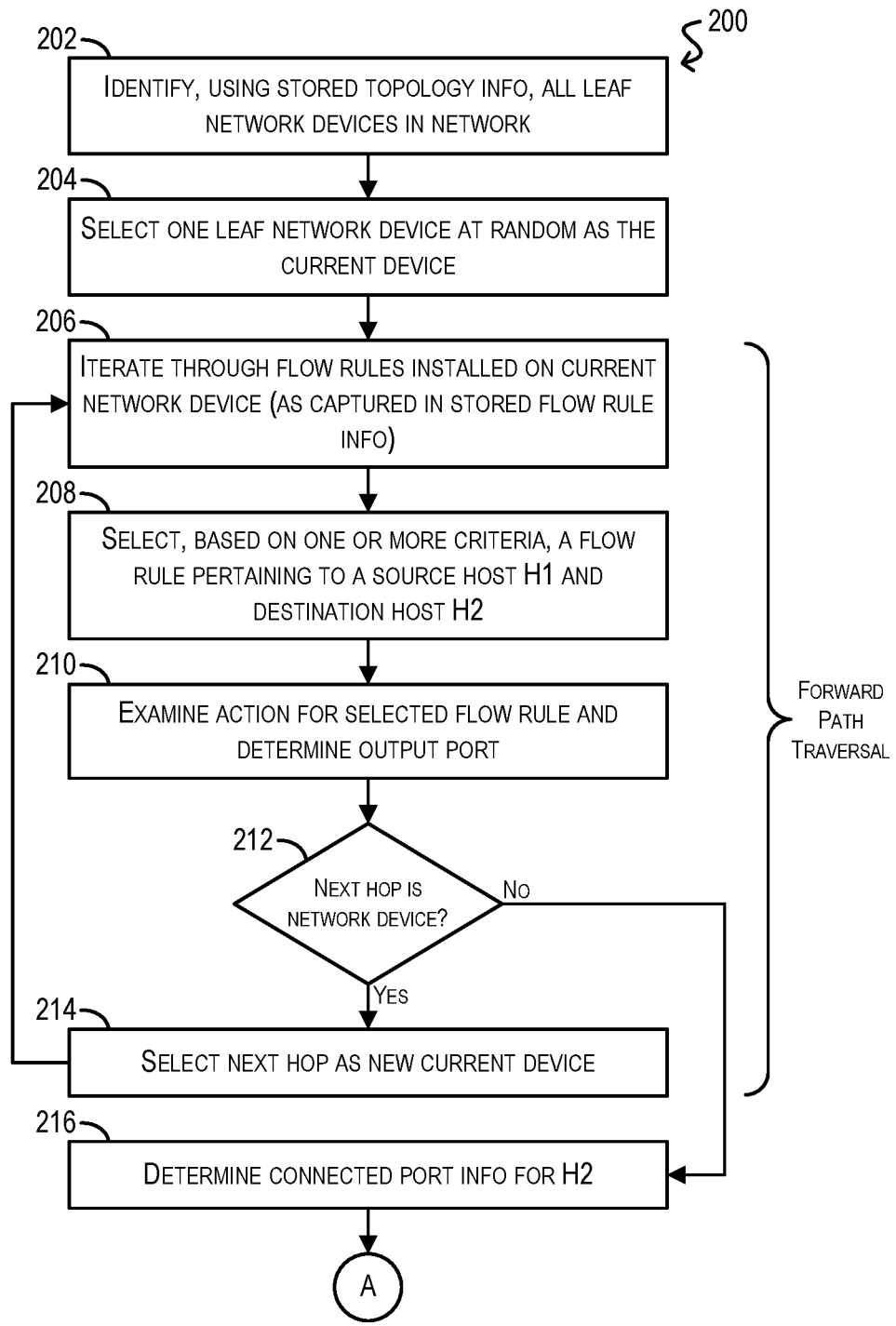
FIGS. 2A and 2B depict a workflow for performing flow-based host discovery according to an embodiment.
Figure 2B:
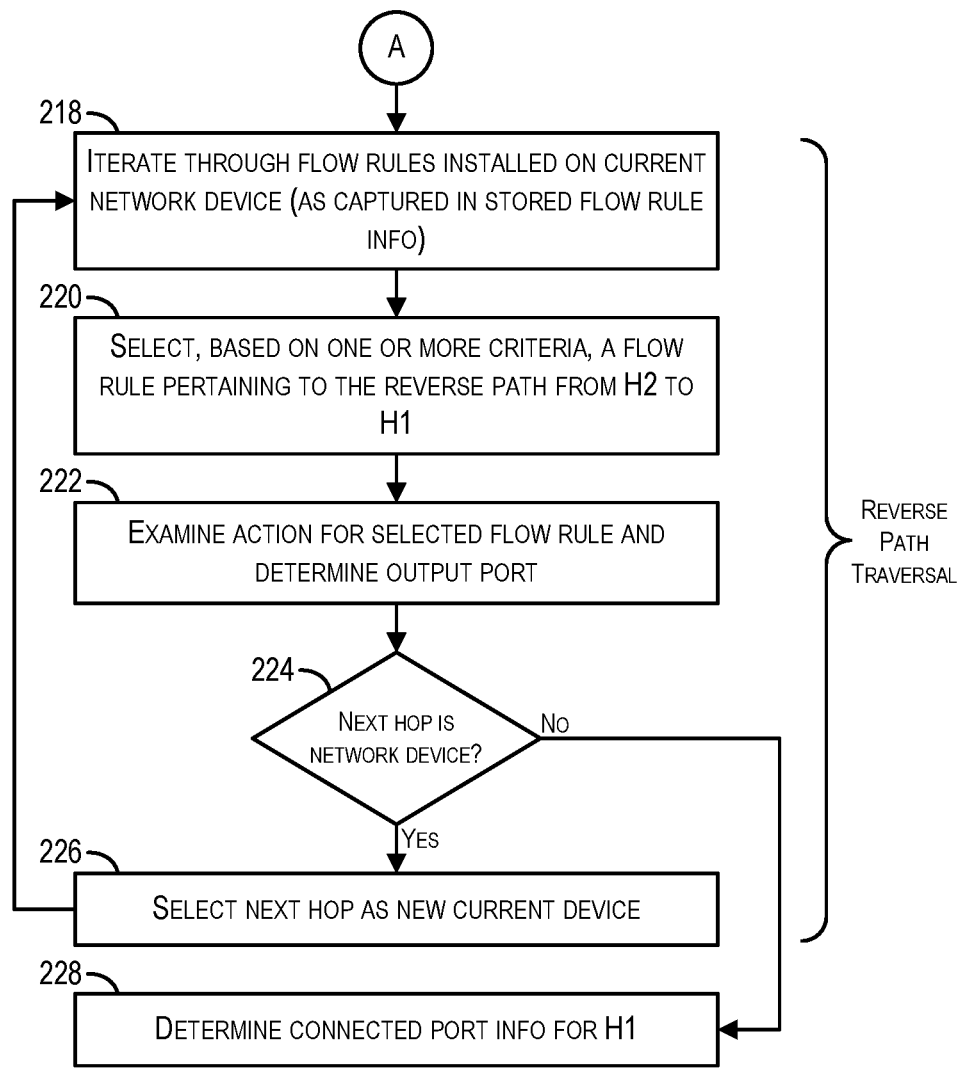

FIGS. 2A and 2B depict a workflow 200 that may be executed by HDS 120 of FIG. 1 for discovering hosts in a connected network (e.g., network 104) according to an embodiment. Starting with block 202 of FIG. 2A, HDS 120 can identify, using topology information 114 maintained in data store 112, all of the leaf network devices in network 104. As used herein, a "leaf network device" is a network device that can potentially be connected to one or more hosts. This is in contrast to "intermediate" or "non-leaf" network devices, which are only connected to other network devices (e.g., other switches, routers, etc.) in a network.

In one embodiment, the processing at block 202 can involve traversing the topology of network 104 as defined in topology information 114 and, for each network device in the topology, examining the number of ports of the device and the number of connected (i.e., neighbor) devices. If the total number of ports and the total number of neighbors is equal, the network device can be identified as a non-leaf device because there are no spare ports to which a host can connect. On the other hand, if the total number of ports is greater than the total number of neighbors, the network device can be identified as a leaf device because there is at least one spare port to which a host can connect.

Once HDS 120 has identified all of the leaf network devices in the topology, HDS 120 can select one of the leaf network devices at random as the "current" network device being evaluated (block 204). HDS 120 can then iterate (i.e., search) through the flow rules programmed on the current network device (as captured in flow rule information 116) and select a flow rule pertaining to a particular source host H1 and/or destination host H2 (blocks 206 and 208). In one embodiment, as part of block 208, HDS 120 can apply the following set of criteria to the flow rules of the current network device and can select the first flow rule that matches any of the criteria:

Source IP address=H1-IP and destination IP address=H2-IP
Source MAC address=H1-MAC and destination MAC address=H2-MAC
Destination IP address=H2-IP
Destination MAC address=H2-MAC In a further embodiment, HDS 120 can apply an additional criterion that requires the selected flow rule to have an increasing flow counter per flow counter information 118.

Upon selecting a particular flow rule corresponding to H1 and H2, HDS 120 can examine the action for the selected rule, which will generally be an action to output a packet matching the match parameters of the rule out of a particular port of the current network device (block 210). Based on this output port information and stored topology information 114, HDS 120 can determine whether the next hop to which the current flow will be forwarded (i.e., the next hop on the forward path of the flow) is another network device in network 104 or not (block 212). For example, if the output port specified in the flow rule's action is P1, HDS 120 can check whether P1 is connected to another network device in network 104's topology.

If the next hop is another network device, HDS 120 can select that network device as the new "current" network device and can loop back to repeat blocks 206-212 with respect to this new current device (block 214). In this way, HDS 120 can essentially traverse through the forward path of the flow between H1 and H2 by examining and correlating the flow rules at each next hop device. In a particular embodiment, upon executing block 208 again for each subsequent hop in the forward path, HDS 120 can apply a slightly different set of criteria (shown below) for selecting the flow rule that corresponds to H1 and H2. This different set of criteria can be applied in the priority order depicted below, such that the first flow rule to match the highest priority criterion is selected.

Source IP address=H1-IP and destination IP address=H2-IP
Source MAC address=H1-MAC and destination MAC address=H2-MAC
Destination IP address=H2-IP
Destination MAC address=H2-MAC
Source IP address=H1-IP/network mask and destination IP address=H2-IP/network mask If, at block 212, the next hop is not another network device in network 104's topology, HDS 120 can conclude that the end of the flow's forward path has been reached (i.e., the current network device is the last device in the forward path). In this case, HDS 120 can determine that H2 is connected to the output port (as defined in the flow rule) of the current network device (block 216), and can initiate a series of steps for traversing the reverse path of the flow as shown in FIG. 2B.

For example, at blocks 218 and 220 of FIG. 2B, HDS 120 can iterate through the flow rules programmed on the current network device (as captured in flow rule information 116) and select a flow rule pertaining to the reverse path from H2 to H1. As part of block 220, HDS 120 can apply a similar set of criteria for selecting the flow rule as block 208; however, the criterion that requires the flow rule's flow counter to be increasing may be dropped (since the flow may be a unidirectional flow, and thus there may not be any traffic in the reverse direction from H2 to H1).

Then at, blocks 222 and 224, HDS 120 can determine the output port specified in the action for the selected flow rule and, based on the output port and stored topology information 114, can determine whether the next hop in the reverse path is another network device in network 104 or not.

If the next hop is another network device, HDS 120 can select that network device as the new "current" network device and can loop back to repeat blocks 218-224 with respect to this new current device (block 226). In this way, HDS 120 can traverse through the reverse path from H2 to H1.

On the other hand, if the next hop is not determined to be another network device at block 224, HDS 120 can conclude that the end of the flow's reverse path has been reached (i.e., the current network device is the first device in the reverse path). As a result, HDS 120 can determine that H1 is connected to the output port (as defined in the flow rule) of the current network device (block 228), thereby completing the discovery process for hosts H1 and H2.

Although not shown in workflow 200, at the conclusion of block 232, HDS 120 can return to block 208 of FIG. 2A in order to select another flow rule pertaining to a different pair of source and destination hosts (e.g., H3 and H4) programmed on the originally selected leaf network device, and this can repeat until all unique flow rules are processed on that device. HDS 120 can then loop through the other leaf network devices in network 104 until all leaf network devices are processed in a similar manner. In this way, HDS 120 can discover all of the possible connected hosts in network 104.

It should be appreciated that workflow 200 is illustrative and various optimizations and modifications are possible. For example, some network topologies, such as trees, exhibit a property where all leaf network nodes are always the first or last nodes of a path in the topology. For these topologies, the reverse path traversal performed at blocks 218-226 of FIG. 2B can be omitted because the forward path traversal will be sufficient to identify the first and last network devices in the each flow's path (and thus, the points of connection of the source and destination hosts).

Figure 3:
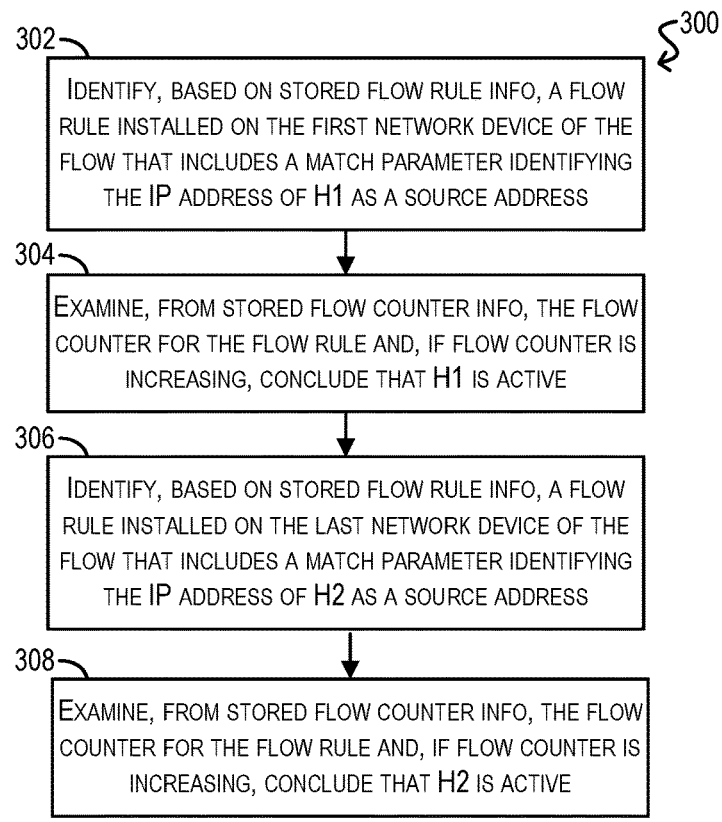
FIG. 3 depicts a workflow for verifying that discovered hosts are active according to an embodiment.

As another example, in some cases it may be useful to verify that the hosts discovered via workflow 200 are, in fact, active (i.e., sending out traffic). This verification ensures that the discovered hosts are physically connected to the network, rather than simply being defined in the proactive flow configuration of the network. FIG. 3 depicts a workflow 300 that may be used to carry out this host activity verification according to an embodiment (note that workflow 300 can be inserted into workflow 200 after block 228).

At block 302, HDS 120 identify, based on flow rule information 116, a flow rule installed on the first network device of the flow that includes a match parameter identifying the IP address of source host H1 as a source address (e.g., source IP address=H1-IP). HDS 120 can then examine, from flow counter information 118, the flow counter for the identified flow rule and, if the flow counter is increasing, HDS 120 can conclude that host H1 is active (block 304).

Similarly, at block 306, HDS 120 can identify, based on stored flow rule information 116, a flow rule installed on the last network device of the flow that includes a match parameter identifying the IP address of destination host H2 as a source address (e.g., source IP address=H2-IP). HDS 120 can then examine, from flow counter information 118, the flow counter for the identified flow rule and, if the flow counter is increasing, HDS 120 can conclude that host H2 is active (block 308).

4. Determining when Active Hosts Become Inactive

Figure 4:
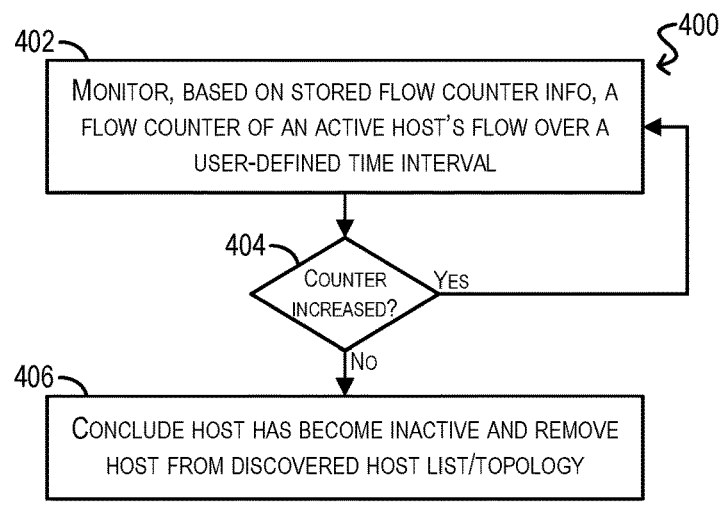
FIG. 4 depicts a workflow for determining when an active host becomes inactive according to an embodiment.

In certain embodiments, in addition to the flow-based host discovery described above, HDS 120 can be configured to determine when a discovered active host becomes inactive (i.e., is no longer sending out any network traffic). FIG. 4 depicts a workflow 400 for implementing this functionality according to an embodiment.

Starting with block 402, HDS 120 can monitor the activity of a discovered active host by monitoring, using flow counter information 118, a flow counter of one or more of the host's related flows. This monitoring can be performed over some user-defined time interval, such as 60 minutes.

At block 404, HDS 120 can check whether the flow counter has increased within the user-defined time interval; if so, HDS 120 can return to block 402 and monitor the flow counter again for the next interval period.

However, if HDS 120 determines at block 404 that the flow counter has not increased, HDS 120 can conclude that the host has become inactive and can remove the host from its discovered host list/topology (block 406). Note that this monitoring process can be executed in parallel for all of the discovered hosts in the network.

5. Example Computer System

Figure 5:
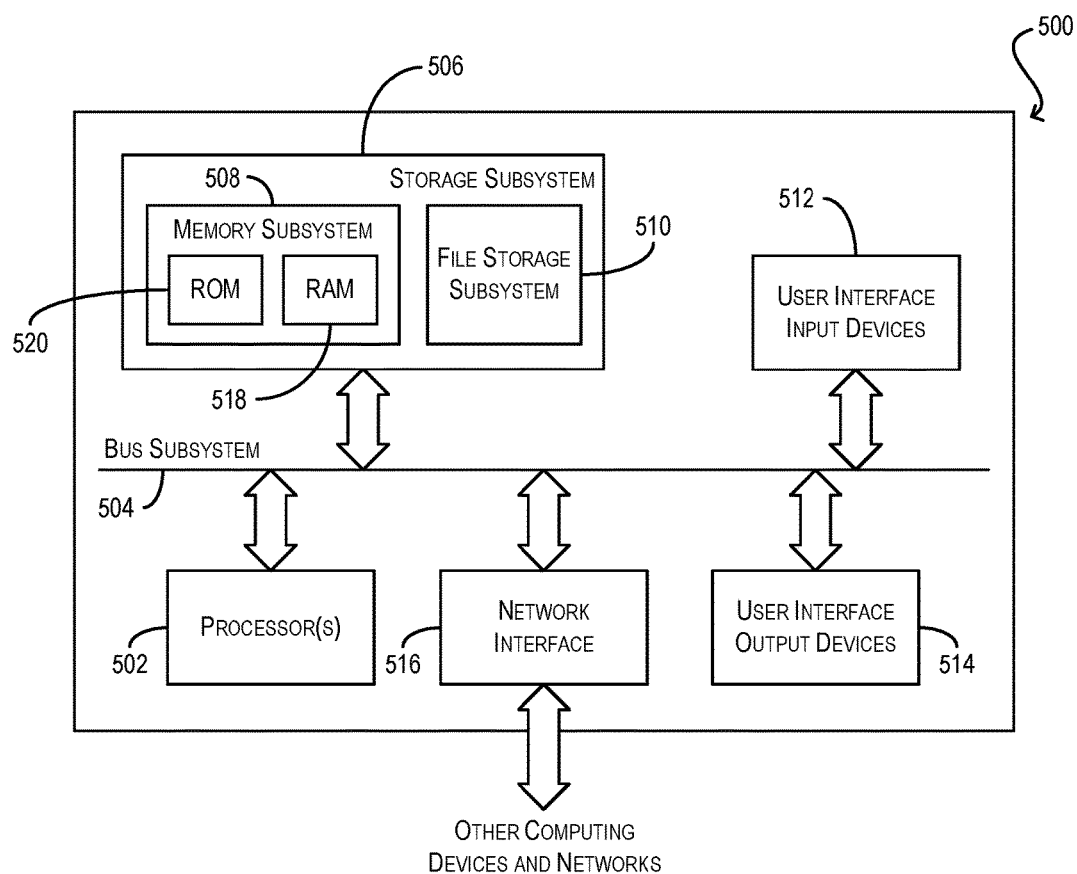
FIG. 5 depicts an example computer system according to an embodiment.

FIG. 5 depicts an example computer system 500 according to an embodiment. Computer system 500 can be used to implement, e.g., SDN controller 102 of FIG. 1.

As shown, computer system 500 includes one or more general purpose processors (e.g., CPU(s) 502 that communicate with a number of peripheral devices via a bus subsystem 504. These peripheral devices include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple buses.

Network interface subsystem 516 can serve as an interface for communicating data between computer system 500 and other computing devices or networks, such as network 104 of FIG. 1. Embodiments of network interface subsystem 516 can include wired (e.g., coaxial, twisted pair, or fiber optic Ethernet) and/or wireless (e.g., Wi-Fi, cellular, Bluetooth, etc.) interfaces.

User interface input devices 512 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 500.

User interface output devices 514 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 500.

Storage subsystem 506 includes a memory subsystem 508 and a file/disk storage subsystem 510. Subsystems 508 and 510 represent non-transitory computer-readable storage media that can store program code and/or data that provide the functionality of various embodiments described herein.

Memory subsystem 508 can include a number of memories including a main random access memory (RAM) 518 for storage of instructions and data during program execution and a read-only memory (ROM) 520 in which fixed instructions are stored. File storage subsystem 510 can provide persistent (i.e., nonvolatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and not intended to limit embodiments of the present disclosure. Many other configurations having more or fewer components than computer system 500 are possible.

6. Example Network Switch

Figure 6:
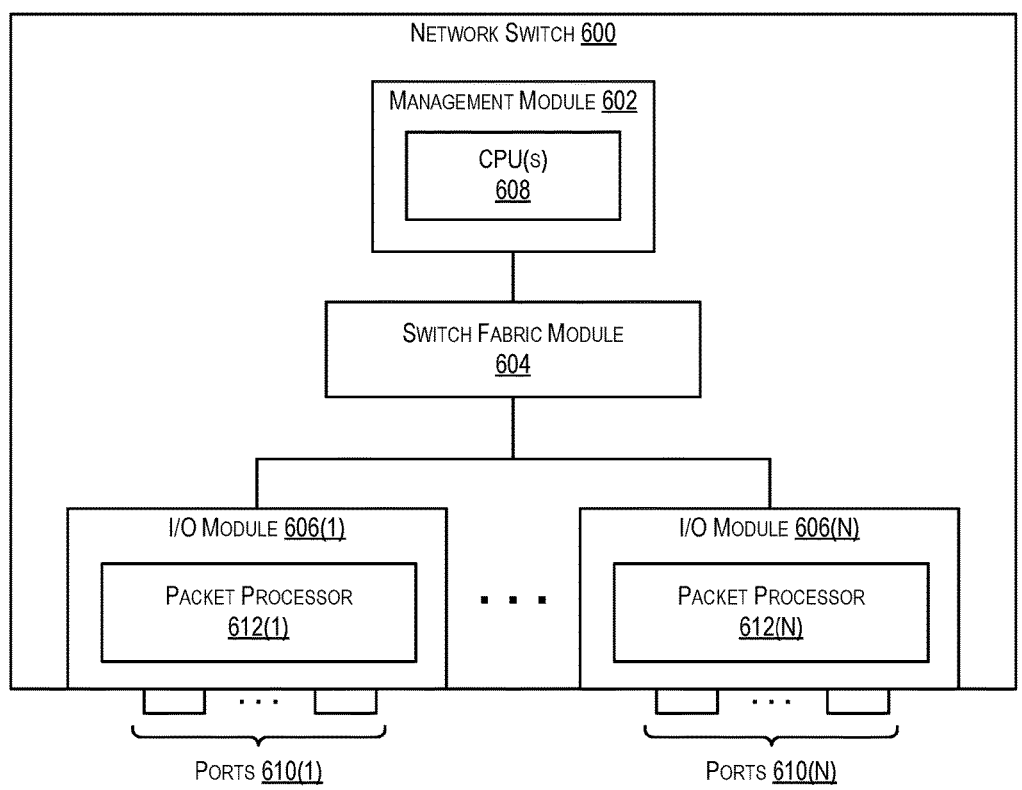
FIG. 6 depicts an example network switch according to an embodiment.

FIG. 6 depicts an example network switch 600 according to an embodiment. Network switch 600 can be used to implement, e.g., network devices 106(1)-(4) of FIG. 1.

As shown, network switch 600 includes a management module 602, a switch fabric module 604, and a number of I/O modules 606(1)-606(N). Management module 602 includes one or more management CPUs 608 for managing/controlling the operation of the device. Each management CPU 608 can be a general purpose processor, such as a PowerPC, Intel, AMD, or ARM-based processor, that operates under the control of software stored in an associated memory (not shown).

Switch fabric module 604 and I/O modules 606(1)-606(N) collectively represent the data, or forwarding, plane of network switch 600. Switch fabric module 604 is configured to interconnect the various other modules of network switch 600. Each I/O module 606(1)-606(N) includes one or more ingress/egress ports 610(1)-610(N) that are used by network switch 600 to send and receive packets. Each I/O module 606(1)-606(N) can also include a packet processor 612(1)-612(N). Packet processor 612(1)-612(N) is a hardware processing component (e.g., an FPGA or ASIC) that can make wire speed decisions on how to handle incoming or outgoing traffic.

It should be appreciated that network switch 600 is illustrative and not intended to limit embodiments of the present invention. Many other configurations having more or fewer components than switch 600 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    selecting, by a software-defined networking (SDN) controller, a leaf network device in a network, the selecting being based on network topology information that is stored on the SDN controller;
    determining, by the SDN controller, a traffic flow corresponding to a flow rule installed on the leaf network device, the traffic flow originating at a source host and ending at a destination host, the determining of the traffic flow being based on flow rule information that is stored on the SDN controller;
    determining, by the SDN controller, a forward path for the traffic flow through the network, the determining of the forward path being performed by associating the flow rule with other flow rules for the traffic flow that are included in the flow rule information, the other flow rules being installed on other network devices in the network;
    determining, by the SDN controller, host information for the source host and the destination host based on at least the forward path; and
    determining a reverse path for the traffic flow through the network, the determining of the reverse path being performed by associating the flow rule with other flow rules included in the flow rule information that correspond to a reversed version of the traffic flow,
    wherein the determining of the reverse path allows the SDN controller to identify a first network device in the forward path and an output port of the first network device to which the source host is connected.

2. The method of claim 1, wherein the network is proactively configured.

3. The method of claim 1, wherein the leaf network device is selected at random.

4. The method of claim 1, wherein the SDN controller selects the flow rule based on one or more criteria that are applied to one or more match parameters of the flow rule.

5. The method of claim 4, wherein the one or more criteria include a criterion that indicates the one or more match parameters should include:
    a parameter for matching a source IP address of an incoming packet with an IP address of the source host; and
    a parameter for matching a destination IP address of an incoming packet with an IP address of the destination host.

6. The method of claim 4, wherein the one or more criteria includes a criterion that indicates the one or more match parameters should include:
    a parameter for matching a source MAC address of an incoming packet with a MAC address of the source host; and
    a parameter for matching a destination MAC address of an incoming packet with a MAC address of the destination host.

7. The method of claim 4, wherein the one or more criteria includes a criterion that indicates the one or more match parameters should include a parameter for matching a destination IP address of an incoming packet with an IP address of the destination host.

8. The method of claim 4, wherein the one or more criteria includes a criterion that indicates the one or more match parameters should include a parameter for matching a destination MAC address of an incoming packet with a MAC address of the destination host.

9. The method of claim 4, wherein the SDN controller further selects the flow rule based on whether a flow counter for the flow rule that is locally stored on the SDN controller is determined to be increasing.

10. The method of claim 1, wherein the determining of the forward path allows the SDN controller to identify the last network device in the forward path and an output port of the last network device to which the destination host is connected.

11. The method of claim 1, wherein associating the flow rule with other flow rules for the traffic flow that are included in the flow rule information comprises:
  determining, based on an action configured in the flow rule, an output port of the leaf network device through which the traffic flow should be forwarded; and
  determining, based on the output port and the network topology information, whether a next hop for the traffic flow is another network device in the network.

12. The method of claim 11, wherein associating the flow rule with other flow rules for the traffic flow that are included in the flow rule information further comprises, if the next hop for the traffic flow is another network device:
  selecting, based on the flow rule information, a flow rule installed on the other network device that corresponds to the traffic flow from the source host to the destination host; and
  determining, based on an action configured in the flow rule installed on the other network device, an output port of the other network device through which the traffic flow should be forwarded; and
  determining, based on the output port of the other network device and the network topology information, whether a next hop for the traffic flow is yet another network device in the network.

13. The method of claim 11, wherein associating the flow rule with other flow rules for the traffic flow that are included in the flow rule information further comprises, if the next hop for the traffic flow is not another network device:
  concluding that the leaf network device is the last network device in the forward path; and
  identifying the destination host as being connected to the output port.

14. The method of claim 1, further comprising, upon determining the host information for the source host and the destination host:
  identifying, based on the flow rule information, a flow rule installed on a first network device of the traffic flow that includes a match parameter for matching a source IP address of an incoming packet with an IP address of the source host;
  determining, based on flow counter information stored on the SDN controller, a flow counter for the flow rule; and
  verifying that the flow counter is increasing.

15. The method of claim 1, further comprising, upon determining the host information for the source host and the destination host:
  identifying, based on the flow rule information, a flow rule installed on a last network device of the traffic flow that includes a match parameter for matching a source IP address of an incoming packet with an IP address of the destination host;
  determining, based on flow counter information stored on the SDN controller, a flow counter for the flow rule; and
  verifying that the flow counter is increasing.

16. A computer system, comprising:
  a processor;
  a storage component storing topology information for a network and flow rule information including flow rules that have been proactively configured in the network; and
  a non-transitory computer readable storage medium having stored thereon program code that, when executed by the processor, cause the processor to:
    select a leaf network device in the network, the selecting being based on network topology information that is stored;
    determine a traffic flow corresponding to a flow rule installed on the leaf network device, the traffic flow originating at a source host and ending at a destination host, the determining of the traffic flow being based on the flow rule information;
    determine a forward path for the traffic flow through the network, the determining of the forward path being performed by associating the flow rule with other flow rules for the traffic flow that are included in the flow rule information, the other flow rules being installed on other network devices in the network;
    determine host information for the source host and the destination host based on at least the forward path; and
    determine a reverse path for the traffic flow through the network, the determining of the reverse path being performed by associating the flow rule with other flow rules included in the flow rule information that correspond to a reversed version of the traffic flow;
    wherein the determining of the reverse path allows the processor to identify a first network device in the forward path and an output port of the first network device to which the source host is connected.

17. A non-transitory computer readable medium having stored thereon program code executable by a software-defined networking (SDN) controller, the program code comprising:
  code that causes the SDN controller to select a leaf network device in a network, the selecting being based on network topology information that is stored on the SDN controller;
  code that causes the SDN controller to determine a traffic flow corresponding to a flow rule installed on the leaf network device, the traffic flow originating at a source host and ending at a destination host, the determining of the traffic flow being based on flow rule information that is stored on the SDN controller;
  code that causes the SDN controller to determine a forward path for the traffic flow through the network, the determining of the forward path being performed by associating the flow rule with other flow rules for the traffic flow that are included in the flow rule information, the other flow rules being installed on other network devices in the network;
  code that causes the SDN controller to determine host information for the source host and the destination host based on at least the forward path;
  code that causes the SDN controller to monitor a flow counter maintained on the SDN controller that identifies a match count for the traffic flow;
  code that causes the SDN controller to determine whether the flow counter has increased within a user-defined time interval; and
  if the flow counter has not increased within the user-defined time interval, determining that the source host has become inactive.

* * * * *